United States Patent

[11] 3,614,251

[72] Inventors: Emil Karl Witzig
Greutterwaldstrasse 19, Weilimdorf;
Rudolf Frank, Am Zuckerberg 41,
Ludwigsburg, both of Germany
[21] Appl. No. 836,012
[22] Filed June 24, 1969
[45] Patented Oct. 19, 1971
[32] Priority July 4, 1968
[33] Germany
[31] P 17 52 711.6

[54] MULTISPINDLE CUTTING MACHINE TO PRODUCE HOLES IN SHEET METAL, FOR EXAMPLE SIEVE STRUCTURES
12 Claims, 5 Drawing Figs.

[52] U.S. Cl. .................................................. 408/3,
83/549, 234/110, 408/53
[51] Int. Cl. .................................................... B23b 39/04
[50] Field of Search ........................................... 77/22, 32.1;
83/549; 234/89, 110

[56] References Cited
UNITED STATES PATENTS

| | | | |
|---|---|---|---|
| 3,001,694 | 9/1961 | Simmerman et al. | 234/110 |
| 2,458,160 | 1/1949 | Grappe | 83/549 |
| 2,945,538 | 7/1960 | Little et al. | 234/110 X |
| 3,246,544 | 4/1966 | Cooper | 77/32.1 |

Primary Examiner—William S. Lawson
Attorney—Flynn & Frishauf

ABSTRACT: A cutting head, relatively positionable with respect to a table, carries a plurality of cutters. To disable selected cutters, for example to leave uncut spokes in a circular sieve structure, the cutters have holding arms connected thereto, which extend into a cam track path. Adjustable cams are positioned on the cam track, by means of a pattern or guide displaced with displacement of the positioning of table and cutter. The particular pattern position is sensed, and controls the positions of the cams on the cam track, so that selected holding arms will be engaged by the cams to disable cutting of predetermined, selected cutters.

EMIL K. WITZIG &
RUDOLF FRANK
Inventors

MULTISPINDLE CUTTING MACHINE TO PRODUCE HOLES IN SHEET METAL, FOR EXAMPLE SIEVE STRUCTURES

The present invention relates to a multispindle cutting machine, and more particularly to an automatic machine to produce perforations in sheet metal, to make blanks for sieves, or the like.

Automatic perforating machines usually include a cutting head in which a plurality of driven spindles are arranged, the cutting head being carried on a pair of vertical columns which are located on either sides of a worktable. The various spindles are driven over gearing from one or more drive shafts. During any one work cycle, a number of holes, corresponding to the number of the spindles, will be produced. Since the spindles must have a certain distance between them, which is frequently less than the distance between the perforations to be formed in the sheet metal, the cutting head (or a portion thereof) is usually sidewise shiftable, so that the perforations can be placed closely together, with only small distances therebetween. Most perforated structures have edge regions, or intermediate spokes or strips which are not perforated. Thus, the machine must be so arranged that spindles in the end region will not be effective to cut holes. It has previously been proposed to provide links and levers which temporarily disable spindles at the ends thereof.

Some perforated blanks require a pattern of perforations in which nonperforated strips extend through otherwise perforated regions; or in which the perforated regions themselves cover an irregular area. Automatic machinery to make such blanks is then not suitable because various accurately predetermined spindles must be disabled during each cutting cycle, the particular disabled spindles changing from cycle to cycle.

In is an object of the present invention to provide an automatic apparatus which will, automatically in sequence make perforated sheet metal strips in which nonperforated regions can be preprogrammed, in a simple manner, which program can be changed to fit any particular desired pattern.

SUBJECT MATTER OF THE PRESENT INVENTION

Briefly, a cutting head carries a plurality of spindles. To disable selected spindles, the spindles are provided with holding arms which extend into a cam track path. The cams are selectively positionable in the path, the positioning of the particular cams depending on a pattern carried on the machine, which is sensed by a sensing head. The program of the disabling of selected cutters can thus be changed by changing the pattern. The pattern is so arranged that it moves with relative movement of the cutting head and the blank to be cut, so that different spindles can be disabled as the cutting head, and the workpiece move relatively to each other.

In accordance with a feature of the invention, the cam track path includes a carrier, on which the cams are shiftably arranged, the exact positioning of the cams, on the carrier, with respect to the cutting spindles being controlled by the pattern. By changing the pattern, any desired configuration of perforations and blank regions between perforations can be made, automatically, and without further operator control.

The invention will be described by way of example with reference to the accompanying drawings, wherein.

Figure 1:
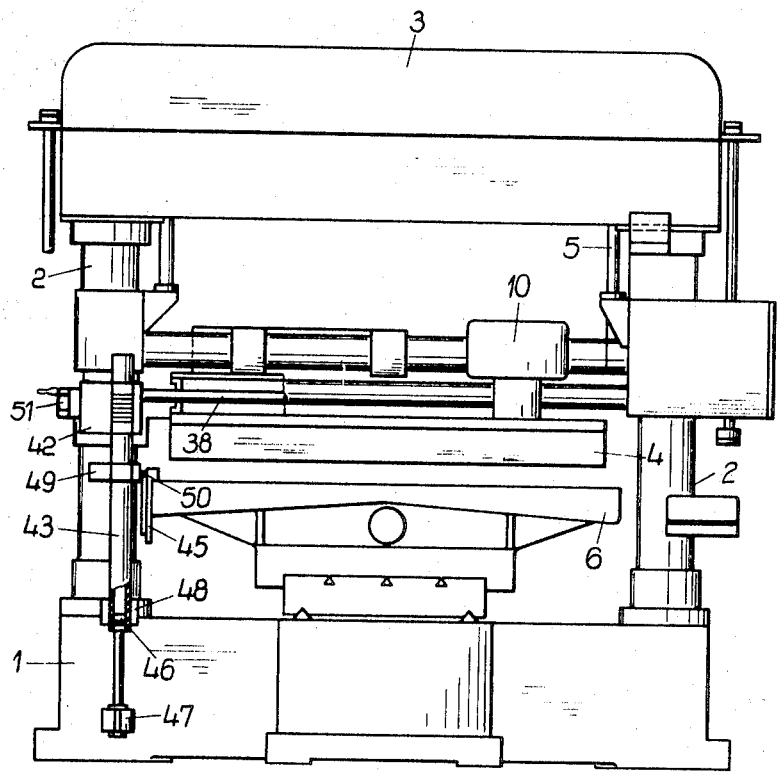
FIG. 1 is a front view of the machine.

A base 1 has a pair of vertical columns 2 secured thereto, interconnected by a crossmember 3, on which a cutting head 4 is vertically, movably mounted. The cutting head 4 is vertically positioned by spindles 5 which cooperate with a positioning mechanism, not shown, located within crossmember 3 to drive spindles 5 over a thread and nut arrangement, as known in the art.

Figure 2:
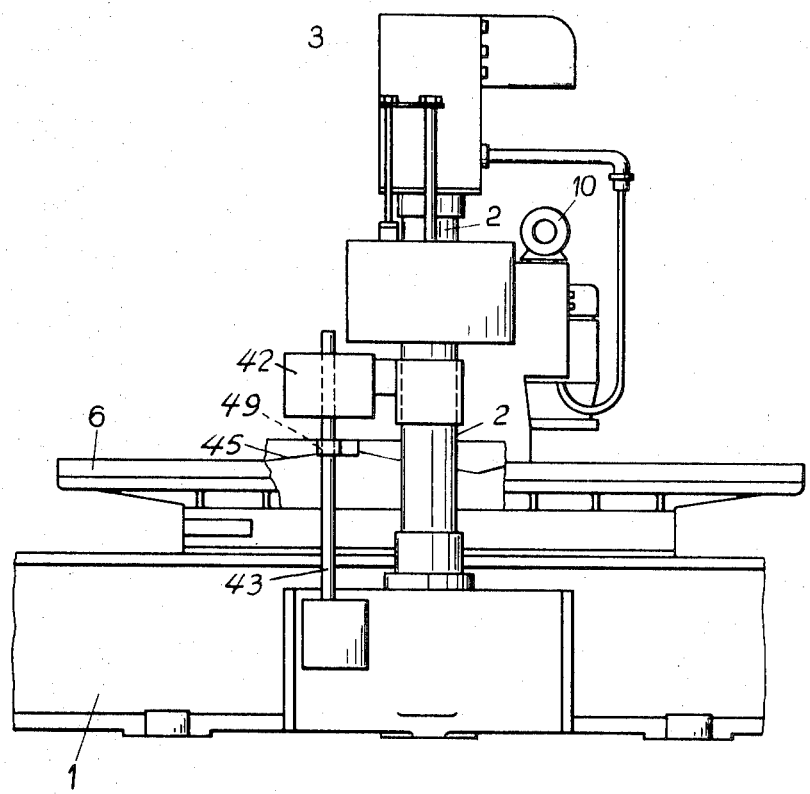
FIG. 2 is a side view of the machine.
Figure 3:
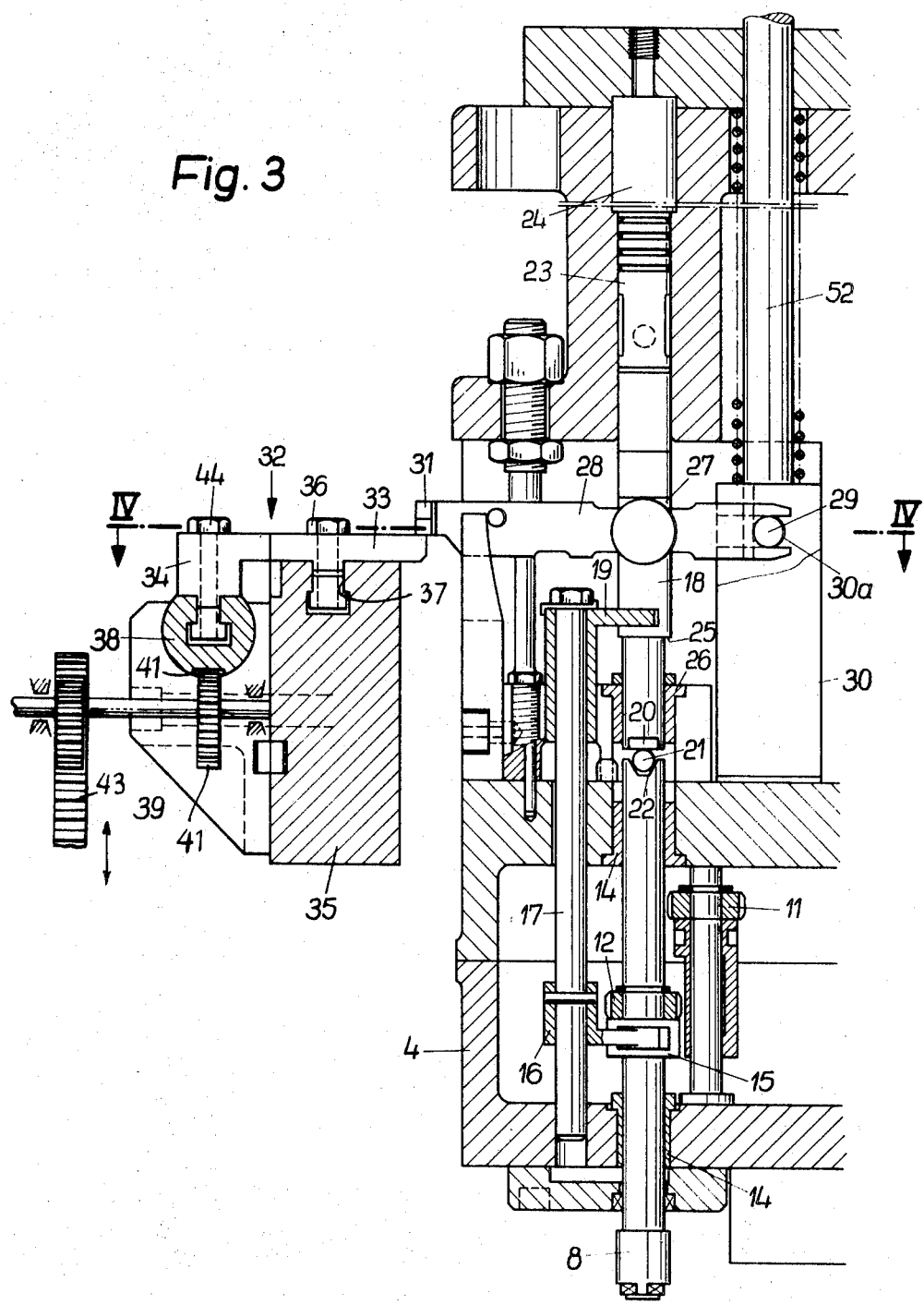
FIG. 3 is a sectional view of the cutting head, to a greatly enlarged scale, illustrating a portion of the cam track path.

A movable worktable 6 is located between columns 2 and beneath cutting head 4. The workpiece blank is secured to table 6, to be moved thereby in a longitudinal direction (see FIG. 2). Perforations 7 (FIG. 5) can be cut into the workpiece blank which, for example, may be a sieve blank. Perforations 7 are preferably drilled, or bored (although other perforating steps may be used) by cutters connected to vertical spindles 8 (FIG. 3). The cutting head 4 of a customary automatic perforating machine may, for example, have 62 such spindles 8, only one of which is shown in detail in FIG. 3. The spindles 8 are driven over intermediate gearing by one or more motors, one being shown at 10 (FIGS. 1 and 2) which are in driving engagement with gears 11, to drive gear 12 on spindle 8.

Figure 5:
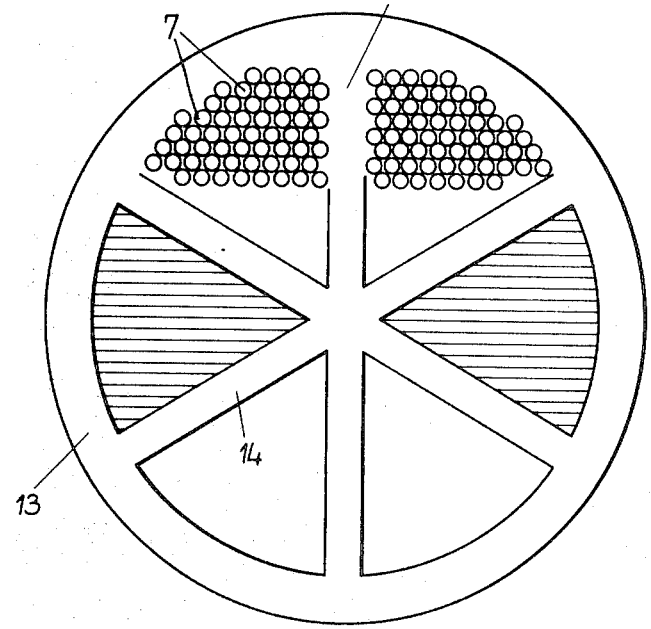
FIG. 5 is a top view of a perforated sheet metal blank illustrating the pattern of perforations made by the machine.

Perforations 7 (FIG. 5) are formed by moving the spindle 8 downwardly. During any working stroke, the entire cutting head 4 is moved, the various spindles therein forming the perforation in the workpiece. If the workpiece as illustrated in FIG. 5, requires a pattern of perforations which is irregular, or is to contain imperforate edge regions 13 and cross-spokes, or strips 14, certain ones of the spindles within cutting head 4 must be disabled.

The various spindles, of which only spindle 8 is shown, are retained in cutting head 4 in sleeve bearings 14. The gear 12 is connected to a carrier ring 15, meshing with a control claw 16, rigidly connected by a connecting rod 17 with a longitudinally movable, but nonrotatably guided bolt 18 by another claw 19. Bolt 18 is provided with a terminating plate 20, of hard, wear-resistant metal, which engages a ball 21 located in a cup 22 at the end of spindle 8. The upper end 23 of the bolt 18 is formed as a hydraulic piston which slides within a hydraulic cylinder 24, which can be connected to a source of oil under pressure. Bolt 18, under pressure of the oil, together with spindle 8 is moved downwardly until shoulder 25 engages stop 26, unless downward motion of the bolt is otherwise inhibited. All of the bolts 18 engaging all spindles 8 are constantly placed under hydraulic pressure which preferably can be smoothly regulated to be subjected to a force of 100 kg. maximum per spindle.

Bolts 18 are formed with a transverse slot 27, through which a lever 28 is passed. Lever 28, at one end, engages around a pin 29 as a first fulcrum point. Fulcrum 29, itself, is formed by a bolt which engages an open slit 30a of lever 28. A stable crosspiece 30 interconnects and carries bolts 29 (FIG. 4), the crosspiece 30 being secured to the machine over cutting head 4 and being movable sideways therewith. The other end 31 of lever 28 extends beyond cutting head 4 and is formed with a small roller, forming a cam follower, cooperating with fixed cams 33 and transversely movable cams 34 (FIG. 4) arranged in a cam track path. Cams 33, 34 are so placed that they cooperate with the ends 31 of preselected levers 28 associated with preselected spindles 8. When the cutting head 4 moves downwardly in order to form a perforation, bolts 18 and the spindles 8 therewith are moved downwardly. If a spindle, for example because it is above a nonperforated crosspiece 14 (FIG. 5) is to be disabled, cams 33, 34 are so located that they will be within the path of the associated lever 28, so as to be struck by the free ends 31 thereof. As the cutting head 4 moves downwardly, lever 28 of the respective spindle cannot pivot about fulcrum 29 to permit bolt 18, together with spindle 8, to effect its downward travel. The end 31 of lever 28 will be retained fixed on the respective cam (cam 33 in FIG. 3). Since the bolts 29 on carrier 30, as well as the cams on the cam track 32 do not move downwardly together with cutting head 4, the respective bolts 18 are held back against the hydraulic pressure in cylinders 24. The spindle 8 is interconnected with bolt 18 over connecting rod 17 and the connecting claw 19, and is thus likewise retained in lifted position and will be disabled from engagement with the workpiece blank, so that no perforation will be formed by the respective spindle.

The cams 33, 34 on cam track 32 can thus control any desired pattern of apertures in the workpiece blank, by retaining spindles 8 in raised position during the downward working stroke of cutting heat 4.

Sleeve bearing 14 permits downward movement of the spindles 8; the gear 11, meshing with gear 12 in the spindles, is elongated to permit relative sliding movement.

Figure 4:
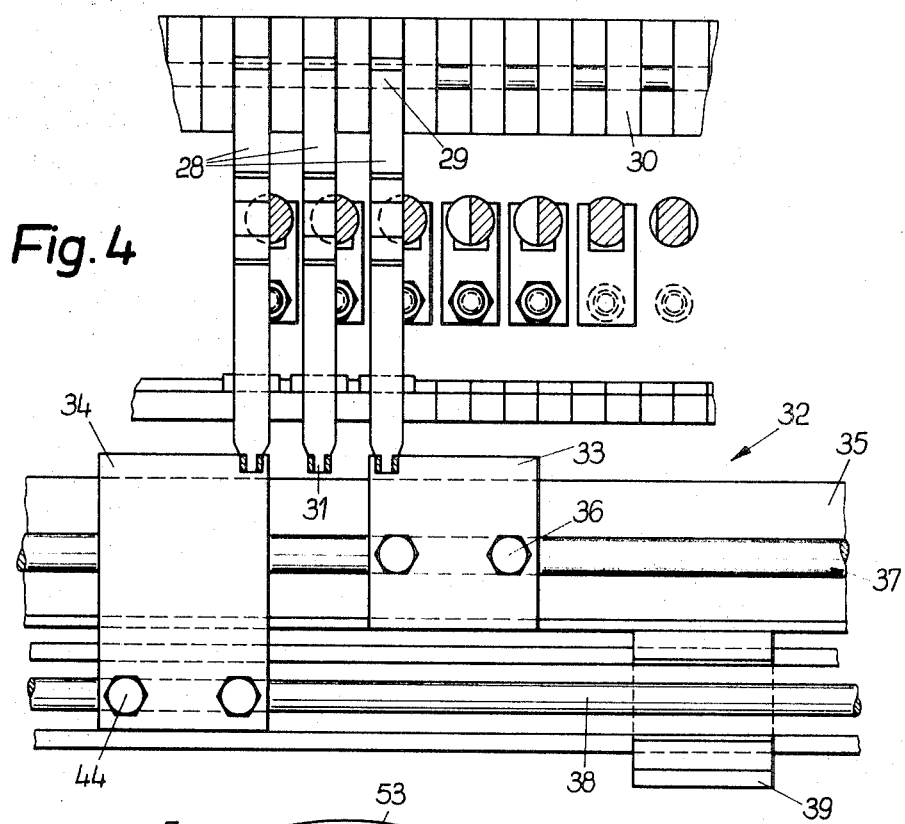
FIG. 4 is a top view of a portion of the cutting head along lines IV—IV of FIG. 3.

Fixed cams 33 are secured to a crossmember 35, rigidly connected to the frame of the machine. Individual adjustment can be made by loosening screws 36, which slide within a guide groove 37, and laterally (FIG. 4) adjust the cams. Laterally movable cams 34 are located between the fixed cams 33. Cams 34 are connected to a laterally twistable cam carrier rod 38, secured in bearing member 39. Rod 38, at its ends, is formed with a gearing 40 (FIG. 3) which meshes with a gear 41 in a gearbox 42. Gearbox 42 includes a right-angle drive. Movement of the gears within gearbox 42 is controlled by a vertical rack 43 which is transmitted to gear 41. Vertical movement of rack 43 thus will cause transverse (in FIG. 1 from left to right) movement of rod 38, and thus move cams 34 from left to right. The particular position of cams 34 on rod 38 can be changed by means of screws 44 (FIG. 4).

The vertical movement of rack 43 is controlled by a pattern 45, arranged at the side of table 6. Only one such pattern is shown, although a pattern, and rack 43 and associated gearing 42 may be arranged on both sides of rod 38. The lower portion of rack 43 is preferably hollow and formed as a hydraulic cylinder which surrounds a piston 46, connected at 47 to the frame of the machine. A pressure fluid is located within the hydraulic cylinder. Rack 43 is connected to a hydraulic sensing head 49 which has a sensing point 50 to scan the control pattern 45.

Control pattern 45 is so arranged that each working stroke of cutting head 4 changes the position of rack 43. After each working stroke, the table 6 moves with respect to the cutting head 4; the relative movement between table 6 and the machine frame (and thus the cutting head) causes movement of the pattern carrier 45 which is sensed by the hydraulic sensor 49, causing vertical movement of the rack 43 which is transmitted by means of gearing 42 to cam rod 38, thus moving the movable cam 34 in such a manner that the subsequent working strike of the cutting head 4 will be carried out with those spindles disabled, which would otherwise impinge on a nonperforate section of the workpiece. The rod 38 is shifted in such a manner that those spindles, with their associated levers 28 will not be permitted to moved downwardly since free movement of the ends 31 will be inhibited by the position of cams 34, of any of the fixed cams 33.

Gearing 42 may preferably be arranged to have a manual override drive 51 to manually set the cams 34, after the interconnection between rods 38 and 43 has been disconnected. It is desirable that the gearing in gearbox 42 has a transmission ratio which can be varied, so that the guiding track of pattern carriers 45 need not be too steep even if substantial movement of rod 38 must occur between subsequent working strokes.

The transverse member 30 is secured by means of a pair of holding rods 52, each resiliently held under pressure of a spring 52'. Member 30 is so arranged that it can be carried along upwardly, together with fulcrum point 29 when the cutting head 4 is moved upwardly beyond a certain limit, for example upon changing of tools, Upon downward movement, the member 30 is held in position at the level of the cam track 32, and beyond that no longer descends with downward movement of the cutting head 4. Rack 43 can readily be made to move freely by release of pressure in the hydraulic cylinder thereof.

Nonperforate straight connecting elements 53 (FIG. 5) extending lengthwise, and straight, are formed by disabling the respective spindles by fixed cams 33 secured by screws 36 to carrier 35. If only straight, longitudinal imperforate sections are to be made, the transversely movable cams 34 can be disabled, so that only fixed cams 33 will become effective. Under most conditions of cutting, both fixed and movable cams 33 and 34 will be used, although fixed cams 33 may be omitted and only movable cams 34 used, depending on the shape of the pattern to be cut.

Various changes and modifications may be made within the inventive concept; the apparatus has been described in detail in connection with a rotatable spindle and boring-type perforating machine, although other types, such as punches, drilling spindles and the like may be used.

We claim:

1. Multicutter cutting machine to produce holes in a sheet-formed workpiece carried on a table (6) in accordance with a predetermined pattern (FIG. 5) having a cutting head (4) relatively positionable with respect to the table;

a plurality of cutters (8) located in the cutting head and vertically movable with respect to the table;

said machine including the improvement comprising holding arms (28) associated with at least some of the cutters;

a cam track path (32) arranged on said machine and having adjustable cams (34) thereon, said cam track path being located in the path of said holding arms (28) upon vertical movement thereof for cutting of holes, said cams engaging selected ones of said arms and preventing movement thereof and thus cutting of holes by the associated cutters;

a pattern means (45) having a pattern thereon representative of the position adjustments of said cams;

and means (49) scanning said pattern means upon relative positioning of the cutting head and the table, said scanning means being connected to control the position adjustment of said cams.

2. Machine according to claim 1, wherein said cutters (8) are in the form of elongated, rotatable spindles;

and nonrotatable axially movable operating bolts (18) are provided bearing against the cutter spindles and moving said spindles into cutting position upon axial movement thereof;

said holding arms (28) being interconnected with said operating bolts and inhibiting movement thereof under control of the cams (33, 34) on said cam track path (32)

3. Machine according to claim 2, including resilient force means (23, 24) bearing on said bolts to urge axial movement thereof.

4. Machine according to claim 2, including a cup and ball joint (20, 21, 22) interposed between said rotatable spindle and said nonrotatable operating bolt.

5. Machine according to claim 2, wherein said holding arm includes an intermediate, forked section interconnected with said operating bolts (18);

one end of said holding arm being pivotally secured over a fulcrum point (29);

and a crossmember (30) secured to the frame of the machine and carrying the fulcrum points for a plurality of holding arms.

6. Machine according to claim 5, including means (52) resiliently suspending said crossmember (30) from the frame of said machine and movable therewith for limited vertical movement in a direction counter the cutting stroke of said cutters (8) to clear the assembly of cutters and holding arms from the workpiece.

7. Machine according to claim 1, wherein said cam track path includes a first cam carrying member (35) carrying a plurality of cams secured thereto, said first cam-carrying member being fixed to the fame of the machine.

8. Machine according to claim 7, wherein said cam track path includes a second cam-carrying member (38) carrying a plurality of cams (34) secured thereto, said second cam carrying member being secured to the frame of the machine and movable with respect thereto.

9. Machine according to claim 8, including rack 43 and gear means 42 engaging said second movable cam-carrying member 38;

and means 43 interconnecting the pattern scanning means (49) and said rack and gear means to operate said rack and gear means and adjust the position of said cams in accordance with the scanned pattern.

10. Machine according to claim 9, wherein said means interconnecting the pattern scanning means and the rack and gear means includes a rack (43) connected with and position controlled by said scanning means (49);
- a rack section (40) formed on said second cam-carrying member (38);
- and a gearing means (41), interconnecting said rack 43 and rack section (40).

11. Machine according to claim 9, wherein said means interconnecting the pattern scanning means and the rack and gear means includes a hydraulically operated piston-cylinder assembly.

12. Machine according to claim 9, wherein the transmission ratio of said rack and gear means is variable.